April 21, 1931.  G. W. GREBENSTEIN  1,802,012
PULLER
Filed Jan. 23, 1930  2 Sheets-Sheet 2
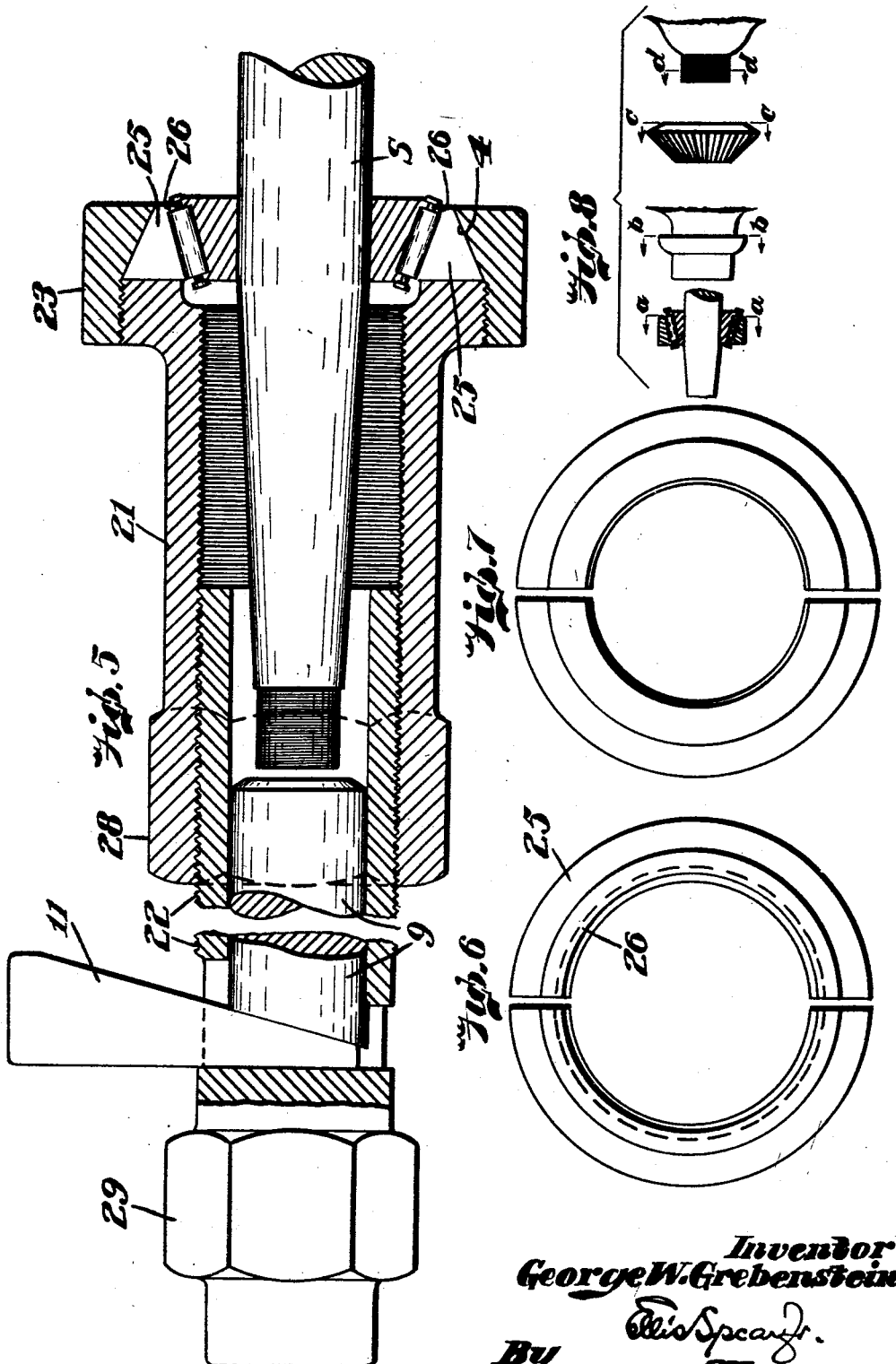
Inventor
George W. Grebenstein
By Ellis Spear Jr.
Attorney Patented Apr. 21, 1931

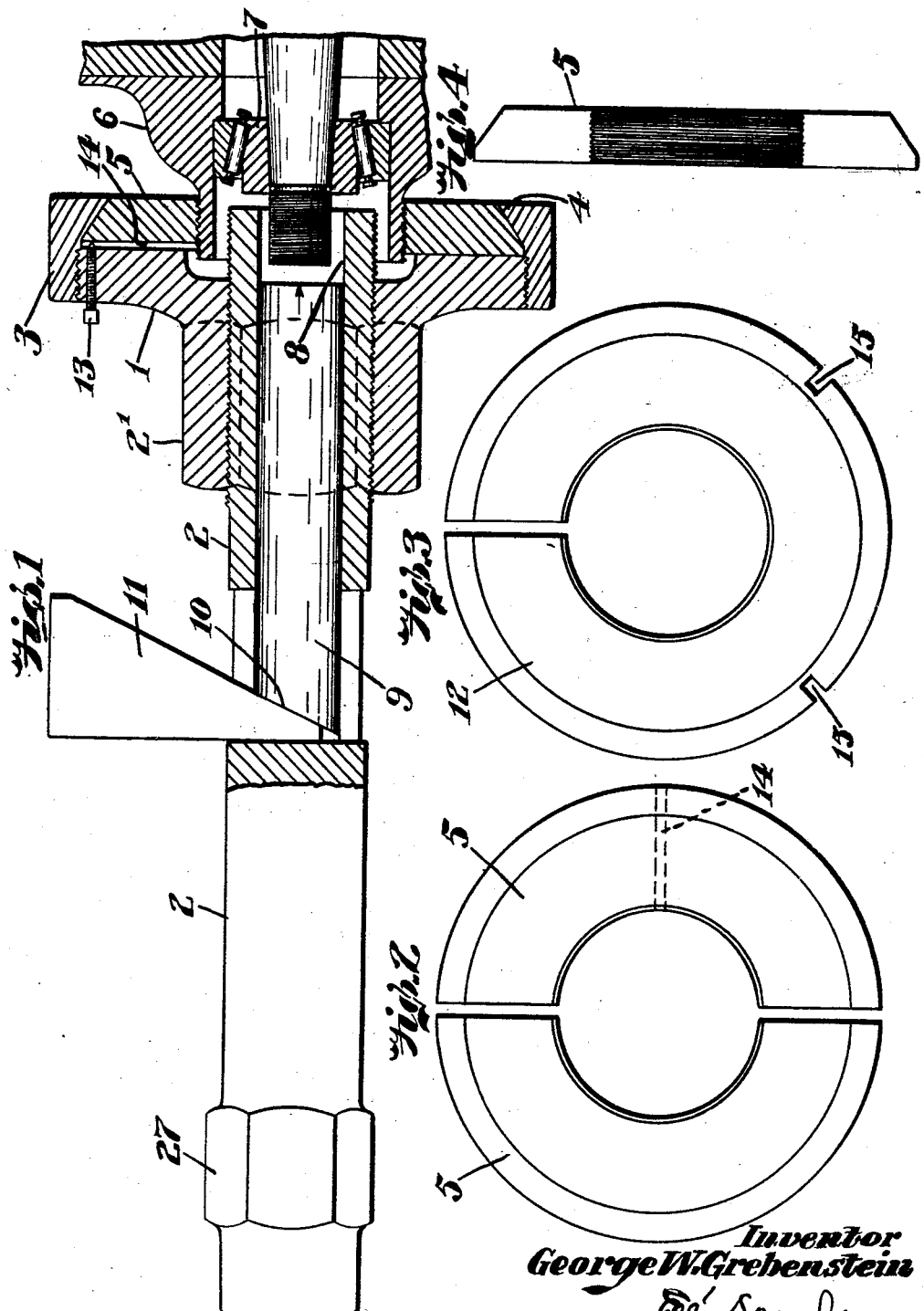

1,802,012

UNITED STATES PATENT OFFICE

GEORGE W. GREBENSTEIN, OF NEWTONVILLE, MASSACHUSETTS

PULLER

Application filed January 23, 1930. Serial No. 422,833.

In my present application I shall deal with the pulling of roller bearings or like members from shafts or axles. Such problem is most immediately and directly involved in the servicing of automobiles and trucks. In such vehicles the bearings must frequently be removed by reason of breakage or for the replacement or repair of other parts. These bearings are difficult to handle because of their own internal intricacy and because as heavy duty parts they become fixed in place after short usage because of their burden of pressure. The removal of such bearings has been a constant problem and a variant one as the location of these bearings varies much in automotive constructions.

My invention contemplates a tool of simple construction capable of dealing with such problems, which tool is capable of embodiment in various types and forms. In the accompanying drawings I have shown a tool basis of embodiment at once practical and simple. In the drawings:

Fig. 1 shows a section of a bearing puller in related position to its work.

Figs. 2 and 3 are face views of adaptors of different type.

Fig. 4 a section through the adaptor of Fig. 2.

Fig. 5 shows the puller in modified assembly for stripping a rear bearing.

Figs. 6 and 7 illustrate adaptors for use therewith, and

Fig. 8 illustrates a collective suggestion of puller problems.

Referring to Fig. 1 I have indicated at 1 a head threaded on a stem or handle 2. The head 1 is provided with a collar 3 having a beveled overhang 4 for clamping any one of the several adaptor plates provided for different pulling jobs for which the tool is intended. The head 1 and the stem 2 are provided with wrench engageable formations as at $2^1$ and 27, respectively.

As shown in Fig. 1, the annular plate 5 is threaded for engagement with the hub 6 having a front roller bearing 7. The stem 2 has a central bore 8 in which is a drive bar 9 having its outer end beveled as at 10 for contact with the wedge key 11.

The adaptor 5 is preferably in two parts as in Figs. 2 and 4, but may be merely split as in the form 12 shown in Fig. 3. To prevent the rotation of such adaptors in assembling, I provide a stop such as the pointed screw 13 tapped through the head. The pointed end may enter a groove as indicated at 14 in Fig. 1, or may enter notches 15 as shown in Fig. 3.

In the modification shown in Fig. 5 my puller is assembled for such a job as that of pulling the rear bearing from a shaft S. In this form a somewhat longer head 21 is used on the handle or stem 22 in order to reach over the axle. The head has the wrench hold 28 and the stem 22 is similarly faced off as at 29. In this case the ring 23 clamps an adaptor 25 having a slight shoulder 26 which just overlaps the roller ends as shown in Fig. 5.

In both assemblies the beveled face of the shoulder 4 of the ring 3 tends to press together the segments of the adaptors and thus tightly grip the work.

As illustrative of some of the more common parts which have to be pulled, I have shown in Fig. 8 from left to right, a roller bearing on a shaft, a hub of beaded or flanged type, a beveled gear and a threaded hub. The points of grip are indicated on each by the bent arrows $a$, $b$, $c$ and $d$, respectively.

The stem 22 is slotted to receive the wedge 11 as in Fig. 1 for driving the bar 9 with respect to said stem. Also, if desired, the wedge 11 may be employed to assure inward movement of the bar 9 with the stem 22 relative to the head 21 when said stem is threaded into said head. That is to say in any of this work the pulling may be done by either the wedge or the screw or by the wedge and the screw in combination one another, but the screw provides for take-up and quick adjustment in any case.

What I therefore claim and desire to secure by Letters Patent is:

1. A puller of the class described comprising a circular head, an axial handle member threaded for axial adjustment therein, an annular collar threaded to the edge of the head and having a beveled rim overlapping the edge of the head face, and a removable replaceable split annular adaptor having its edge beveled for contact with the collar rim, said handle having an axial bore, a driving pin movably mounted in the bore, and a wedge through said handle bore and contactable with the end of the driving pin.

2. A puller of the class described comprising a head, a contractile adaptor for engagement with a part to be pulled, an element detachably connected with the head for holding the adaptor in assembly therewith, means whereby a pulling force exerted on the head produces a contractile clamping action of the adaptor on the part to be pulled, and a member threaded in the head for cooperation with a part carrying the part to be pulled.

3. A puller of the class described comprising a head, a contractile adaptor for engagement with a part to be pulled, a collar detachably connected with said head for holding the adaptor in assembly therewith, said collar and said adaptor having cooperating wedge surfaces whereby a pulling force exerted on the head produces a contractile clamping action of the adaptor on the part to be pulled, and a member threaded in the head for cooperation with a part carrying the part to be pulled.

4. A puller of the class described comprising a head, a contractile adaptor for engagement with a part to be pulled, an element detachably connected with the head for holding the adaptor in assembly therewith, means whereby a pulling force exerted on the head produces a contractile clamping action of the adaptor on the part to be pulled, a member threaded in the head, and a bar slidably mounted in said member for cooperation with a part carrying the part to be pulled.

In testimony whereof I affix my signature.

GEORGE W. GREBENSTEIN.